April 13, 1937. T. A. BOWERS 2,076,539
PISTON RING MATERIAL
Filed July 2, 1934  2 Sheets-Sheet 1
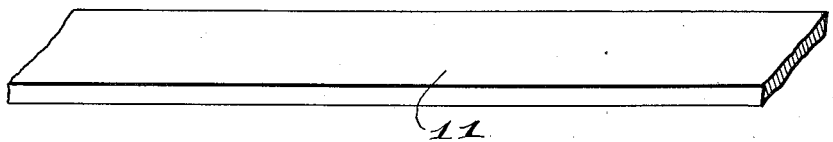
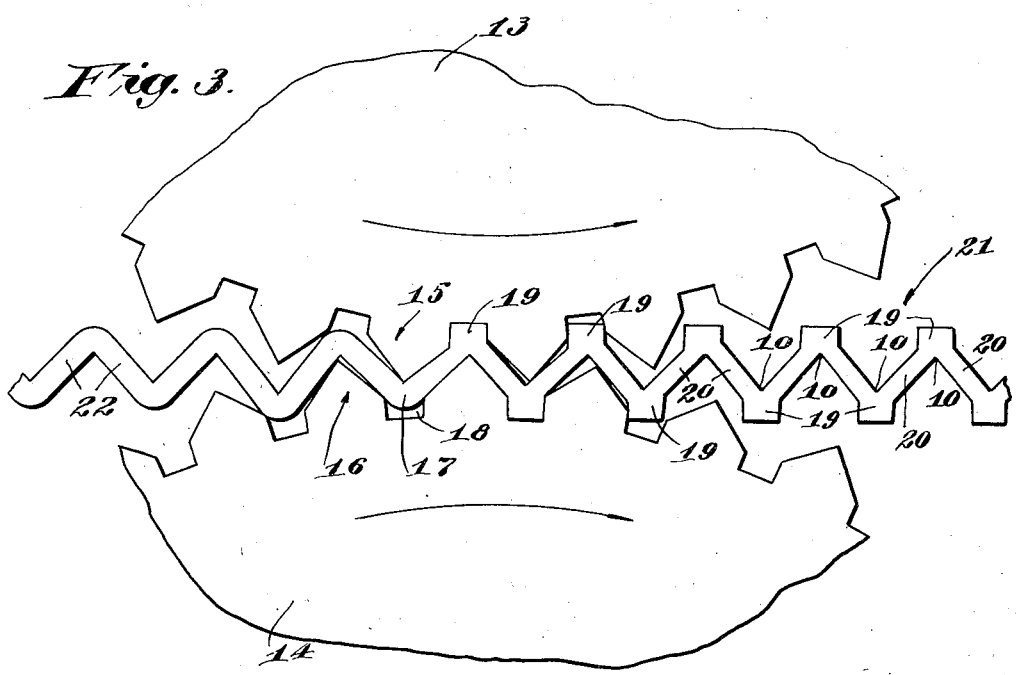
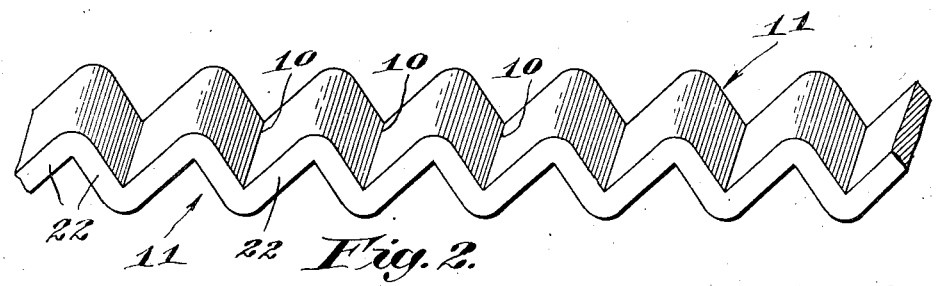
Inventor
Thomas A. Bowers.
By James C. Hamilton
Attorney April 13, 1937. T. A. BOWERS 2,076,539
PISTON RING MATERIAL
Filed July 2, 1934   2 Sheets-Sheet 2

Inventor
Thomas A. Bowers
By James E. Hamitt
Attorney

Patented Apr. 13, 1937

2,076,539

UNITED STATES PATENT OFFICE 2,076,539

PISTON RING MATERIAL

Thomas A. Bowers, Boston, Mass., assignor to Flexion, Inc., Boston, Mass., a corporation of Massachusetts Application July 2, 1934, Serial No. 733,472

5 Claims. (Cl. 29—156.61)

My present invention relates to an improved piston ring material, and it should be understood that the resultant product comprising an improved piston ring is described and claimed in my co-pending applications, Ser. No. 733,243, filed June 30, 1934, and Ser. No. 54,153, filed Dec. 12, 1935, of which this application is a continuation in part. More particularly my present invention relates to an improved metal ribbon piston ring material in the construction of which a single ribbon is formed into a series of oppositely disposed crowns and connecting webs with such crowned portions at their weakest point, having a thickness equal to or greater than that of the said side webs. A particular improvement in my present invention comprises a piston ring material having pre-formed crowns and webs which are fashioned with a keystone shape.

In the trade, it is a well known fact that engine cylinder bores, especially those of internal combustion engines, are worn out-of-round and in time develop a pronounced oval surface due to the thrust of the connecting rod from the crank shaft. This results in excessive use of oil and lost compression and while the piston rings may be renewed to improve such a condition, they do not adequately do so for the reason that the new piston rings, when inserted in the cylinder bore, are true circles, while the cylinder bore itself is slightly oval. The need is for flexibility and it is well known that numerous attempts have been made to develop a flexible piston ring which will conform to the irregular periphery of a worn cylinder bore. Improvements have mainly been with respect to solid or cast metal piston rings of a character known in the trade as, "C Type Piston Rings", in which the piston ring has an opening at one point and obtains its wall pressure from the lateral spring thrust of the ring itself when it is reduced in diameter from its normal open state upon inserting in the smaller cylinder bore. There have been attempts to provide a flexible piston ring formed from a fabricated metal ribbon but many difficulties have ensued not previously overcome.

In my present invention, I have developed a new piston ring material which makes it possible to produce a piston ring similar in some respects to older types but greatly differing in certain more important features whereby inherent difficulties in such older types are practically eliminated.

My improved piston ring material is formed from a metallic ribbon. Briefly, the metal ribbon is reversely bent to form a series of V shaped bends with the bending point on the under side of each bend having a sharply defined line, hereinafter referred to as, "apex line", and the upper surface of the bend later flattened to form the land surface of the ring.

It will be apparent that merely closing a conventionally folded bent material together and then flattening the rounded portions comprising the bends will not produce a practical land surface. The reason for this is that a certain amount of material must be flowed from the tops of the rounded portions to fill the space therebetween in order to provide a flat land surface. This amount of material, which is flowed is great enough to materially weaken these rounded portions and to such an extent that the ring, at these points, will become so thinned that there will be no reserve metal left at these points for normal wear which must be present on the land surface of any piston ring.

In addition to this distinct and objectionable weakness in a piston ring material thus fabricated, there also develops a further characteristic in piston ring material of this type produced by conventional folding methods which may be considerably improved upon. This characteristic is the set which a given length of the material assumes when folded and closed together which will be of a relatively straight line nature as opposed to the circular form it must assume when pressed to form a piston ring.

To obviate such undesirable features, I go further in the art and after the V shaped bends have been formed, but before closing the material, I pass it through a special set of forming gears more fully described further along in the specifications and by so doing, I thin down the webs connecting such bends and force the metal resulting thereby into the tops of the bends. There are obtained crowns having perfectly flat land surfaces and provided with a thickness equal to or greater than that of any one of the webs to the effect that adequate wearing thickness of the land surface of the ring is secured.

And even further, I may produce a length of piston ring material which is pre-formed and developed by the use of forming years such that the crowns and webs become keystone-shaped and may be closed together without die pressure and when such closing does occur it must do so along a circular path producing a closed ring having a circular set. It will be apparent that all of the advantages of a flexible ring of this character such as compressibility, elasticity, radial wall pressure and the like are present in addition to the advantages accruing from pre-forming and developing the keystone-shaped formation in the ring material itself.

The principal object of my invention is therefore an improved piston ring material;

Another object is an improved piston ring material formed from a single ribbon material;

Another object is an improved piston ring material comprising a processed metal ribbon having a thickened land portion;

Another object is a piston ring material formed from a metal ribbon having thickened alternate keystone-shaped crowns with flattened land surfaces and keystone-shaped connecting web portions;

Still another object is an improved piston ring material having keystone-shaped crown portions and connecting keystone-shaped web portions adapted to be closed together;

A still further object is an improved fabricated piston ring material having pre-formed crown and web portions adapted to be closed in a circumferential manner;

And still another object is an improved piston ring material having pre-formed crown and web portions for the purpose of completing a finished piston ring and thereby obviating forming die operations, and Other objects comprising the construction and operation of my device will appear as the description of the same progresses.

In the drawings, illustrating the preferred embodiment of my invention;

Fig. 1 shows a perspective view of the ribbon material;

Fig. 2 is a perspective view of the ribbon material shown in Fig. 1 in one of the initial steps through which it is passed;

Fig. 3 shows another step in the forming of the piston ring material;

Figure 4:
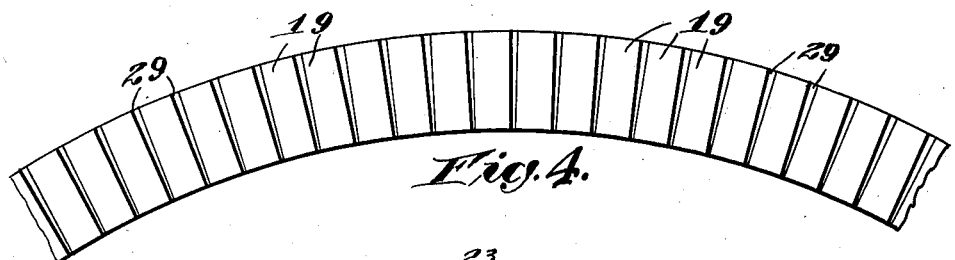
Fig. 4 is a fragmentary plan view illustrating a circularly bent length of the ring material having preformed thick crowns of rectangular shape.

Referring more in detail to the drawings, Figs. 1 to 7 inclusive illustrate my invention in more or less diagrammatic form and for purposes of clarity the various elements have been greatly exaggerated in scale.

Figs. 2 and 3 show several steps in the forming of the piston ring material in which the flat ribbon shown in Fig. 1 is reversely bent and formed with the under side of each bend having a sharply defined apex line indicated at 10 on the bent ribbon 11.

The bent or crimped ribbon 11 may be heated for the purpose of increasing its malleability and may then be passed through the special gears shown at 13 and 14, the said gears being provided with specially shaped teeth 15 and 16 respectively as shown in Fig. 3.

It will be noted that the gear teeth 15 and 16 are positioned apart such that the spacing between their opposing sides, when on center, is appreciably smaller than the thickness of the metal ribbon 11, and owing to this fact, the metal is caused to flow into the roots of the teeth of the gears 13 and 14. An example of this action is shown at 17 where the material is just beginning to flow into the space 18. This process continues alternately forming tops and bottoms, termed crowns, thereby resulting in the heavy portions, indicated at 19, which have a thickness, between their top faces and the sharply defined apex line 10, greater than the thickness of the side webs 20 and producing a material like that shown at the right-hand side of Fig. 3.

Figure 5:
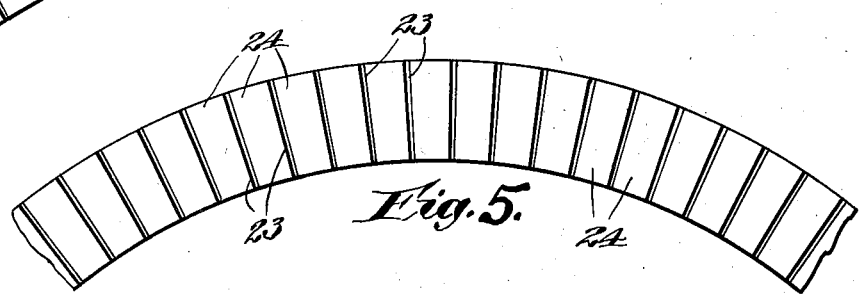
Fig. 5 is a plan view similar to that shown in Fig. 4 and further illustrating a length of circularly compacted ring material having preformed thick crowns of a keystone shape.
Figure 6:
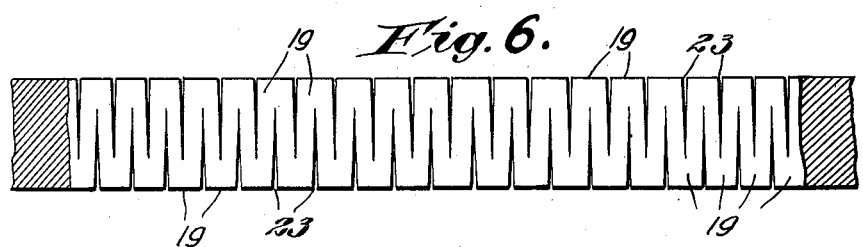
Fig. 6 is a vertical cross section taken centrally of a compacted ring of the preformed keystone crown material.

The teeth 15 and 16 of the gears 13 and 14 may, if desired, be beveled, although such beveling has not been illustrated. Fig. 5 is intended to illustrate a material of the so-called keystone shape modification which may be formed with gears having the referred to beveled construction. With such keystone crown construction, the outer side of a crown or segment 19 will be greater than the respective inner side.

It should be noted that throughout the drawings proportions have been greatly exaggerated for the purpose of clarity and the crowns 19 of the material 21 may be made heavier or thinner according to the amount of flowing of the metal comprising the side webs 22 of the bent or crimped material 11. It should also be understood that in some cases it may not be necessary to heat the material comprising bent or crimped material shown in Fig. 2 before it is formed by the gears 13 and 14.

Some of the mechanism used in the apparatus which produces the material 21, is purposely not shown for simplicity. However, such apparatus and process steps, as are shown are for the purpose of clearly illustrating the forming of the material 21 as disclosed in Fig. 3 which results in the finished material and piston ring set forth in Figs. 4 to 7 inclusive.

It will be understood that when a material is provided or the open keystone shaped character, it will be adapted to compact along a circular path. This is of advantage under some circumstances as it may eliminate certain die operations.

Fig. 4 illustrates the material having rectangular shaped crowns with the material being in an uncompacted state. The interstices 28 are rectangular in outline as viewed from above in Fig. 5, and interstices 29 are keystone shaped in outline as viewed from above in Fig. 4.

In a piston ring made to fit a cylinder bore three and three-eighths inches in diameter and constructed from a ribbon approximately thirty one-thousandths of an inch thick, there occur approximately two hundred and twenty-five interstices. Normally the piston ring is considerably larger in diameter than the bore of the cylinder but when its two ends are abutted, the entire piston ring can be contracted to provide for a decrease in diameter and circumference owing to the closing of these interstices under pressure and the piston ring may then be inserted in the smaller cylinder bore. Under these conditions the piston ring maintains a continuous unbroken line of contact around the cylinder bore regardless of the fact that the cylinder bore may be slightly oval due to excessive wear.

It is further pointed out that, owing to the sharply defined line 10, such a piston ring material, compressed, as in a cylinder bore, has perfectly defined vertical webs which tend to very slightly increase the vertical height of the crowned portions rather than shorten such height as happens in the case of a piston ring of this character which obtains its interstices by means of slotting a solid metal body or in the case where the bottoms of the interstices are not formed with a sharp apex line.

In my improved piston ring material, I have developed a series of reversely disposed crowns 19 from the bent or crimped material illustrated in Fig. 2 which are as thick as or thicker than the side webs which support them and by so doing, I make it possible to produce a piston ring from a bent or crimped ribbon in which the bent over portions of the ribbon present a continuous flat piston ring land surface without flowing the metal in the top bends to such an extent that the piston ring would collapse, and the crown thickness can be made equal to or greater than that of the webs.

Figure 7:
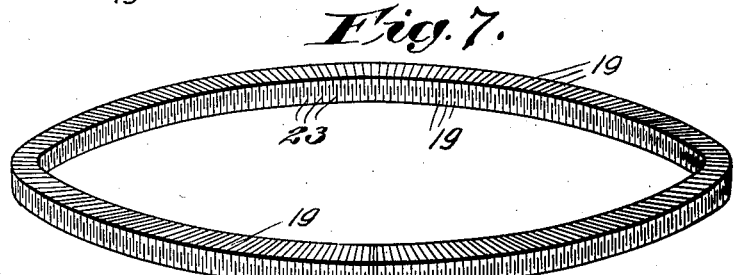
Fig. 7 is a perspective view of a finished ring illustrating the interstices thereof in a substantially closed state.

From the above description, it will be seen that I have produced a novel piston ring material from which a piston ring such as that shown in Fig. 7 may be obtained and which is composed of a multiplicity of keystone-shaped crown and web portions, such keystone formations may be developed in the material itself before closing and such material when closed together obviates the necessity of using expensive dies and presses which have heretofore been necessary to produce the keystone-shaped crowns and web portions which are essential in a piston ring of this character.

At the same time, I have also produced a material having a crown and land portion of as great or greater thickness than the side webs which connect them together, therefore resulting in a new combination of elements in a single ribbon piston ring material.

Having thus described my invention what I claim as new is:

1. A piston ring material comprising a plurality of separated keystone shaped crowns and obliquely arranged connecting keystone shaped webs, the said crowns having substantially flat top portions and substantially perpendicular sides.

2. An improved piston ring material formed from reversely bent meal ribbon, comprising a plurality of separated keystone shaped crowns and obliquely connecting web portions said crowns having a vertical dimension at least equal to the thickness of one of said webs.

3. An improved piston ring material formed from a reversely bent metal ribbon comprising a plurality of separated crowns and obliquely connecting web portions, said crowns having a vertical dimension greater than the thickness of one of said webs.

4. An improved piston ring material formed from a reversely bent metal ribbon comprising a plurality of separated crowns and obliquely connecting web portions, said crowns having a vertical dimension at least equal to the thickness of one of said webs considered laterally.

5. An improved piston ring material formed from a reversely bent metal ribbon, said material comprising a plurality of separated crowns and obliquely connecting web portions, and said crowns having a vertical dimension at least equal to the thickness of one of said webs considered laterally of the length of the material, the said crowns having a width considered transversely of the length of material greater than the width of the ribbon from which the material was formed.

THOMAS A. BOWERS.